United States Patent
Gray et al.

[11] Patent Number: 5,805,705
[45] Date of Patent: Sep. 8, 1998

[54] SYNCHRONIZATION OF ENCRYPTION/DECRYPTION KEYS IN A DATA COMMUNICATION NETWORK

[75] Inventors: James P. Gray, Chapel Hill; Raif O. Onvural; Mohammad Peyravian, both of Cary, all of N.C.

[73] Assignee: International Business Machines Corporation, Armonk, N.Y.

[21] Appl. No.: 592,931

[22] Filed: Jan. 29, 1996

[51] Int. Cl.[6] .................................................. H04L 9/12
[52] U.S. Cl. ................................. 380/48; 380/21
[58] Field of Search ................. 380/48, 49, 21

[56] References Cited

U.S. PATENT DOCUMENTS

| | | | |
|---|---|---|---|
| 3,956,615 | 5/1976 | Anderson et al. | 380/49 |
| 4,434,323 | 2/1984 | Levine et al. | 380/48 |
| 5,241,598 | 8/1993 | Raith | 380/48 |
| 5,581,614 | 12/1996 | Ng et al. | 380/20 |
| 5,621,799 | 4/1997 | Katta et al. | 380/48 |

*Primary Examiner*—Salvatore Cangialosi
*Attorney, Agent, or Firm*—Gerald R. Woods

[57] ABSTRACT

To enhance the security provided by data encryption in a data communication network, the encryption/decryption keys are changed periodically at the source and destination nodes for an established connection. A destination node must know not only the value of any new key but also when to begin using that key to decrypt received data packets. Synchronization (making sure a data packet is decrypted using a decryption key correlated with the encryption key used to encrypt the same packet) is achieved by defining a single bit in each packet header as a key synchronization bit. As long as key synchronization bit value remains unchanged from one received packet to the next, a receiving node will continue to use the same decryption key it has been using. When a change in the key synchronization bit value is detected, the receiving node will begin using a previously-received, new decryption key.

16 Claims, 4 Drawing Sheets

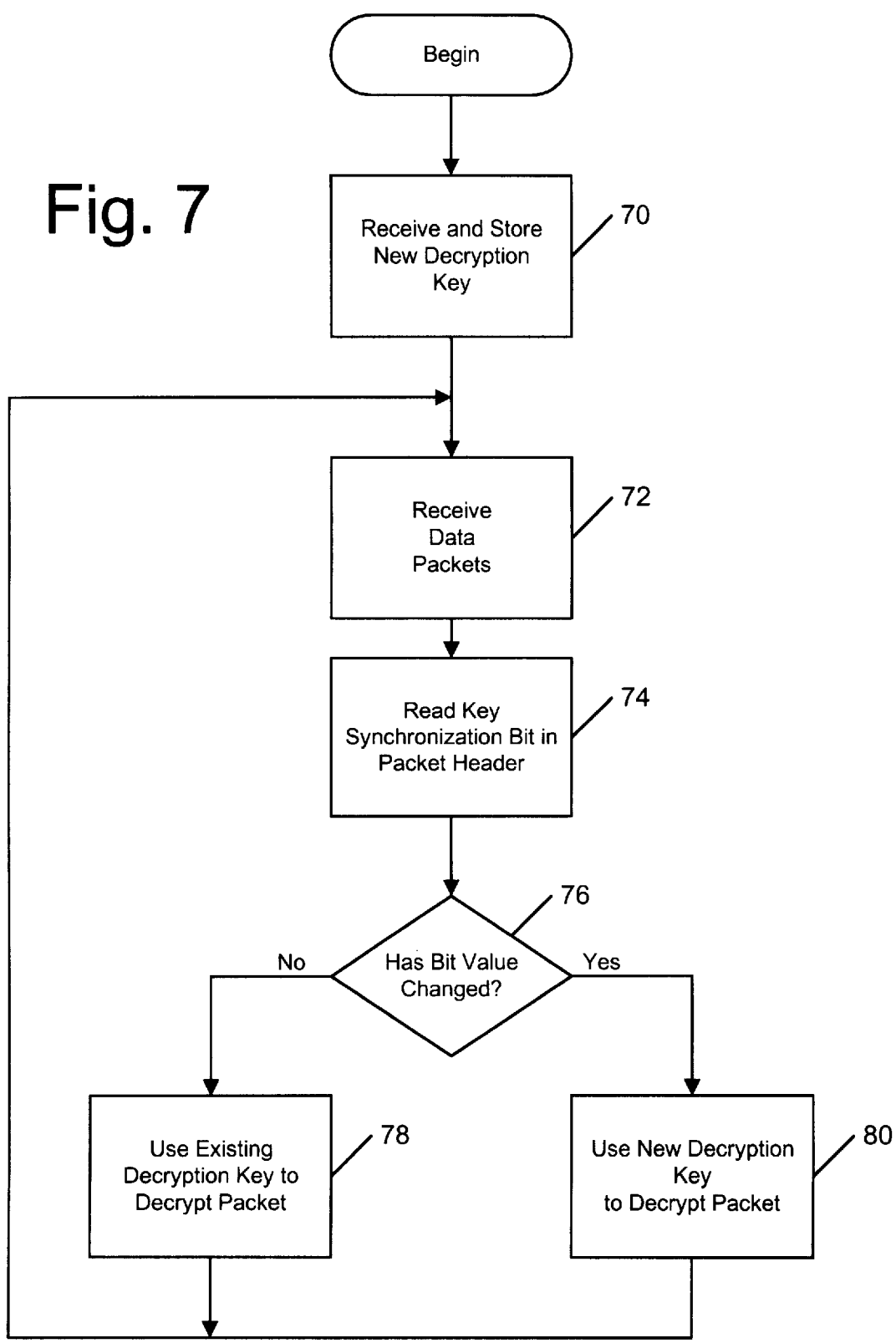

SYNCHRONIZATION OF ENCRYPTION/DECRYPTION KEYS IN A DATA COMMUNICATION NETWORK

FIELD OF THE INVENTION

The present invention relates to data communications and more particularly to a technique for synchronizing use of encryption and decryption keys at source and destination nodes in a data communication network.

BACKGROUND OF THE INVENTION

Data communication networks can be categorized as handling transfers of data on either a circuit-switched basis or a packet-switched basis. Where two users want to exchange data in a network which utilizes circuit switching, a path must be established through the network before the data exchange can begin. Once the path is set up, it continues to exist for the duration of the data exchange between the users. If the same two users were connected through a packet-switched network, it would not be necessary to set up and maintain a "circuit" between them. In a packet-switched network, user data is formatted in discrete data units or packets, each of which contains the routing information needed by intermediate systems or nodes to transfer the packet toward its intended destination over currently available links. When an information exchange or call has been set up between a particular source node and a particular destination node, it is conventionally said that a "connection" exists between the two nodes even though there is no physical connection and successive data packets being transferred between the nodes may not even follow the same physical paths through the network in getting from the source node to the destination node.

A type of packet-switching technology that is becoming increasingly pervasive is Asynchronous Transfer Mode (ATM) technology. In ATM networks, user data is formatted in fixed length cells, each of which includes a header field and a data field. The standard header field is five bytes in length and contains all necessary control and routing information for allowing the cell to be switched through the network toward its destination. The standard data field is forty-eight bytes long. The use of fixed length cells permits much of the necessary switching within the network to be carried out using specialized, high-speed hardware switches.

Users of any kind of data communication network, and not just ATM networks, are often concerned about concealing their data from eavesdroppers (sometimes called interlopers) on the network. Considerable time and effort has been spent developing cryptographic techniques which permit original data (sometimes referred to as plaintext or cleartext) to be encrypted or "scrambled" before it is transmitted as "ciphertext" through the network and then decrypted or returned to its original or plaintext form once it reaches the intended destination. Many encryption techniques employ "keys", which are values that control the encryption and decryption processes.

An illustration of an extremely simple, and largely ineffective, encryption approach is to replace each plaintext character in a message by a character "n" positions away in the alphabet, wrapping or returning to the beginning of the alphabet where the plaintext character is within "n" positions of the end of the alphabet. For example, if n=3, the plaintext word "safe" would translate to the ciphertext word "vdih". In this example, 3 would be considered the encryption key. As long as the party receiving the ciphertext message knows the encryption method and the key, recovery of the plaintext message is relatively simple.

Any effort by an eavesdropper to recover plaintext from an encrypted message is referred to as an "attack" on the message. Just as there are different kinds of encryption, there are different kinds of attacks aimed at discovering the key used to encrypt the plaintext data. Where a user must select the encryption key, it is human nature for that user to select an easily remembered key, such the user's own last name or the name of a favorite hobby; e.g., "golf" or "sailing". Eavesdroppers can take advantage of human nature by employing a "dictionary attack" in which names, English words (for example, all of the words in an unabridged dictionary), birthdays, etc. are tried as decryption keys to see if plaintext is generated. Where an eavesdropper knows the names of the sending and/or receiving parties or the time of transmission of the ciphertext message or other transmission-related information, a "traffic analysis attack" may be mounted by using such information in an effort to find the encryption key. More detailed information about the subject of cryptography is available from a number of references, including the book Bruce Schneier, "Applied Cryptography—Protocols, Algorithms and Source Code in C", John Wiley & Sons (1994). While the present invention is intended for use in networks in which cryptography is practiced, the invention can be understood without requiring any information from this book.

In theory, nothing precludes the performance of encryption/decryption operations without ever changing the keys used to control such operations. In practice, it would be foolish to do that. The longer a particular key remains in use, the greater the chance that an interloper will discover that key and use it in a successful attack on encrypted messages being transmitted over the connection.

A standard data security practice is to periodically change the keys used for encryption/decryption operations. Each new key must be passed on to any node expected to decrypt data encrypted using that key. Equally significantly, a decrypting node must know when to begin using a new key. If a destination node uses an old key in an attempt to decrypt data encrypted at a source node using a new key, the output will be plaintext garbage, not useful data.

Conventionally, encryption/decryption keys are established when a connection is set up between two nodes and remain in use for the duration of the connection. Since some connections may persist for periods of weeks or even months, for example, between two host systems, a failure to change the keys other than at connection setup represents a data security risk.

SUMMARY OF THE INVENTION

The present invention is a simple technique for maintaining synchronization between the key used in encrypting a data packet at a source node in a data communication network and the key used in decrypting the same data packet once it is received at a destination node in the network. The technique permits keys to be updated without interrupting an established connection between the two nodes.

Before a new key can be activated at a destination node, the key necessarily must have been communicated to that node. The destination node will have stored but not activated the received key. When the source node initiates the use of the new key, it causes a predetermined binary value to be written into predetermined bit positions in the header of each data packet encrypted using the new key. The destination node monitors the predetermined bit positions in each received data packet. When the predetermined binary value is detected in a header, the destination node switches to the new key to decrypt the packet.

BRIEF DESCRIPTION OF THE DRAWINGS

While the specification concludes with claims particularly pointing out and distinctly claiming that which is regarded as the present invention, details of the invention may be more readily ascertained from the following detailed description when read in conjunction with the accompanying drawings wherein:

FIG. 7 is a flow chart of operations that are performed at a destination node in order to maintain synchronization between the keys used to encrypt a particular data packet at a source node and to decrypt the same data packet upon its receipt at a destination node.

DESCRIPTION OF PREFERRED EMBODIMENTS

Figure 1:
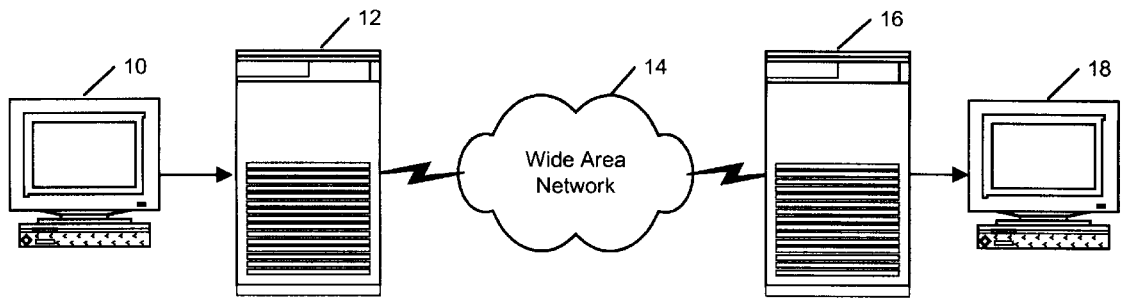
FIG. 1 is a simplified view of major components of a network in which the present invention may be practiced.

In any data communication network, the ultimate objective is to be able to transport data from first user to a second user. While the term "user" is typically assumed to mean a human user, from a network standpoint, the actual data users are devices such processors, printers or even workstations, such as the workstations 10 and 18 shown in FIG. 1. The workstations 10 and 18 are connected to a shared wide area network 14 through intermediate communication processors 12 and 16, respectively. The functions performed by communication processors vary depending upon the characteristics of the wide area network and of the attached workstations. For example, if the wide area network 14 implements Asynchronous Transfer Mode (ATM) protocols, a communication processor might handle the functions of segmenting data received from a workstation into a series of fixed length data cells and of generating a header for each cell with information needed to transfer the cell through the network. Such functions are generally referred to as ATM adaption functions. The same processor might be used to encrypt that data. A counterpart processor at the receiver would reassemble the data into a format usable by the receiving workstation by decrypting the data contained in received cells and by reassembling the data into longer data segments usable by the receiving workstation.

Figure 2:
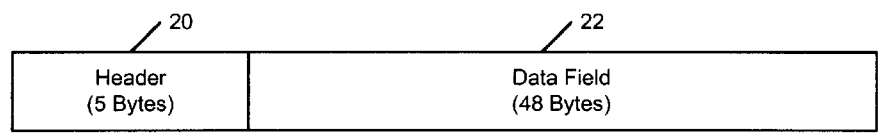
FIG. 2 shows the high level format of a standard Asynchronous Transfer Mode (ATM) cell.

Referring to FIG. 2 and as noted earlier, a standard ATM cell includes a five byte header field 20 which contains control and routing information for the cell and a forty-eight byte data field 22 which contains the actual user data and possibly an error checking character. From time to time, the data field 22 may be referred to as the "data payload" or just the "payload" of the cell. While use of the invention, as described below, causes the contents of the header field to be altered, the same basic five byte header and forty-eight byte data structure is maintained at all times within the network.

Figure 3:
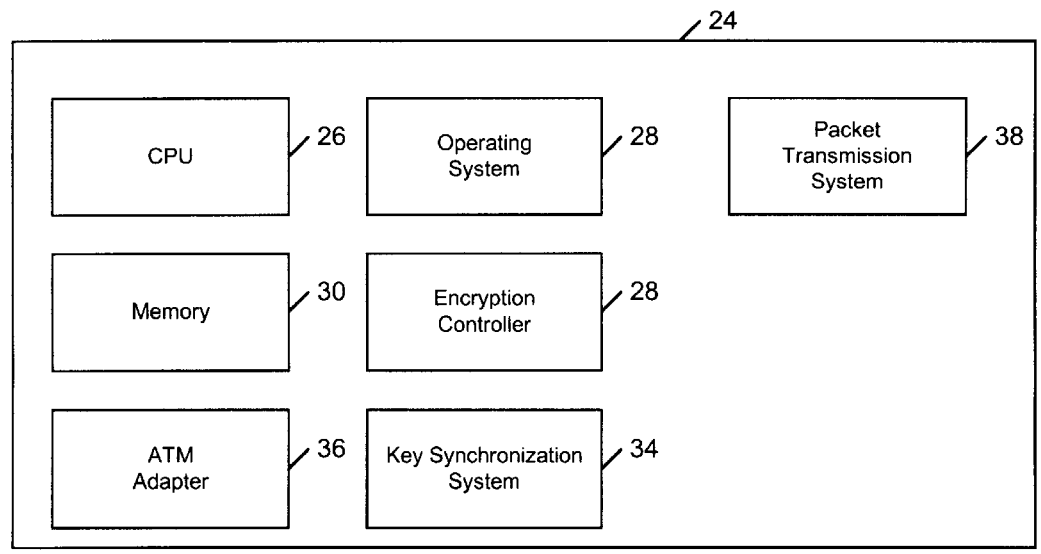
FIG. 3 is a simplified view of the major functional components of a source node capable of implementing the present invention.

For data to be successfully transferred in encrypted form from a source, such as workstation 10, to a destination, such as workstation 18, the devices which actually perform the encryption/decryption operations must synchronize their use of encryption/decryption keys. The necessary functions may be implemented either in software executed by a general purpose processor or as firmware or microcode written for a special purpose processor. In either case, some hardware, such as buffer registers or memory is employed in the course of the process. FIG. 3 is a block diagram of functional components required to implement the invention at a source node 24. The source node 24 necessarily includes a processor or CPU 26 which operates under the control of an operating system 28 as well as memory components 30 for storing both data and program instructions. Assuming data supplied to the source node 24 is not already in standard ATM cell format, the system may include an ATM adapter component 36, which will convert received data to standard ATM format. The source node 24 also includes an encryption controller 32 which performs required encryption operations on the data payload of each ATM cell and a key synchronization system 34. The key synchronization system 34 will store needed encryption keys and perform other operations, to be described in more detail below, required to assure synchronization of encryption and decryption keys in active use at source and destination systems. The source node will further include a packet transmission component 38 for transmitting ATM cells after the data payloads in the cells are encrypted using the current encryption key.

Figure 4:
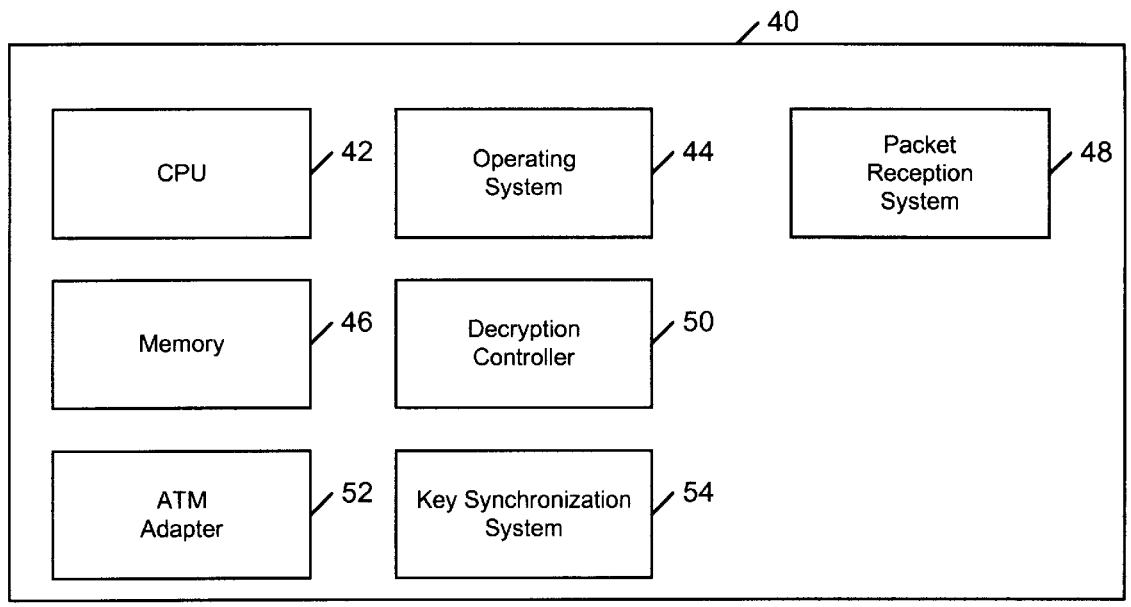
FIG. 4 is a simplified view of the major functional components of a destination node capable of implementing the present invention.

Referring to FIG. 4, a destination node 40 will have a number of components which also exist in a source node. For example, any destination node capable of implementing the present invention will include a CPU 42, an operating system 44 and memory 46. In fact, a given node ordinarily can operate either as a source system or a destination system at different times, which means that the same processor or operating system or memory will perform source or destination functions at different times. A destination node will also include a packet receiving system 48 for receiving ATM cells from the wide area network, a decryption controller 50 for decrypting the data payload of each cell and a key synchronization system 54 for making sure that the decryption key used for a particular ATM cell corresponds to the encryption key used in encrypting that same cell. Finally, unless the data is to be transported from the destination node in native ATM cell format, the node will include an ATM adapter function 52 for performing any necessary cell sequencing and desegmentation operations.

Figure 5:
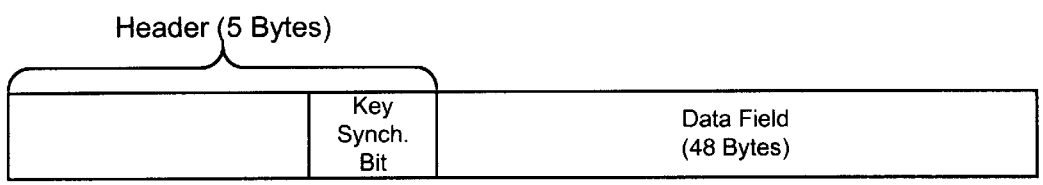
FIG. 5 depicts an ATM cell with a format modification required for implementation of a preferred embodiment of the present invention.

In a preferred embodiment of the invention and as shown in FIG. 5 of the drawings a single bit position in one of the five header bytes of a standard ATM cell is defined as a key synchronization bit (KSB) position 56. A change in the binary value stored in KSB position 56 from one data packet to the next is a signal to a destination node that a new decryption key (previously sent to and stored by the node) is to be activated. Once the new decryption key is activated, the KSB value in packets received at the node should remain constant until another new decryption key is to be activated.

Figure 6:
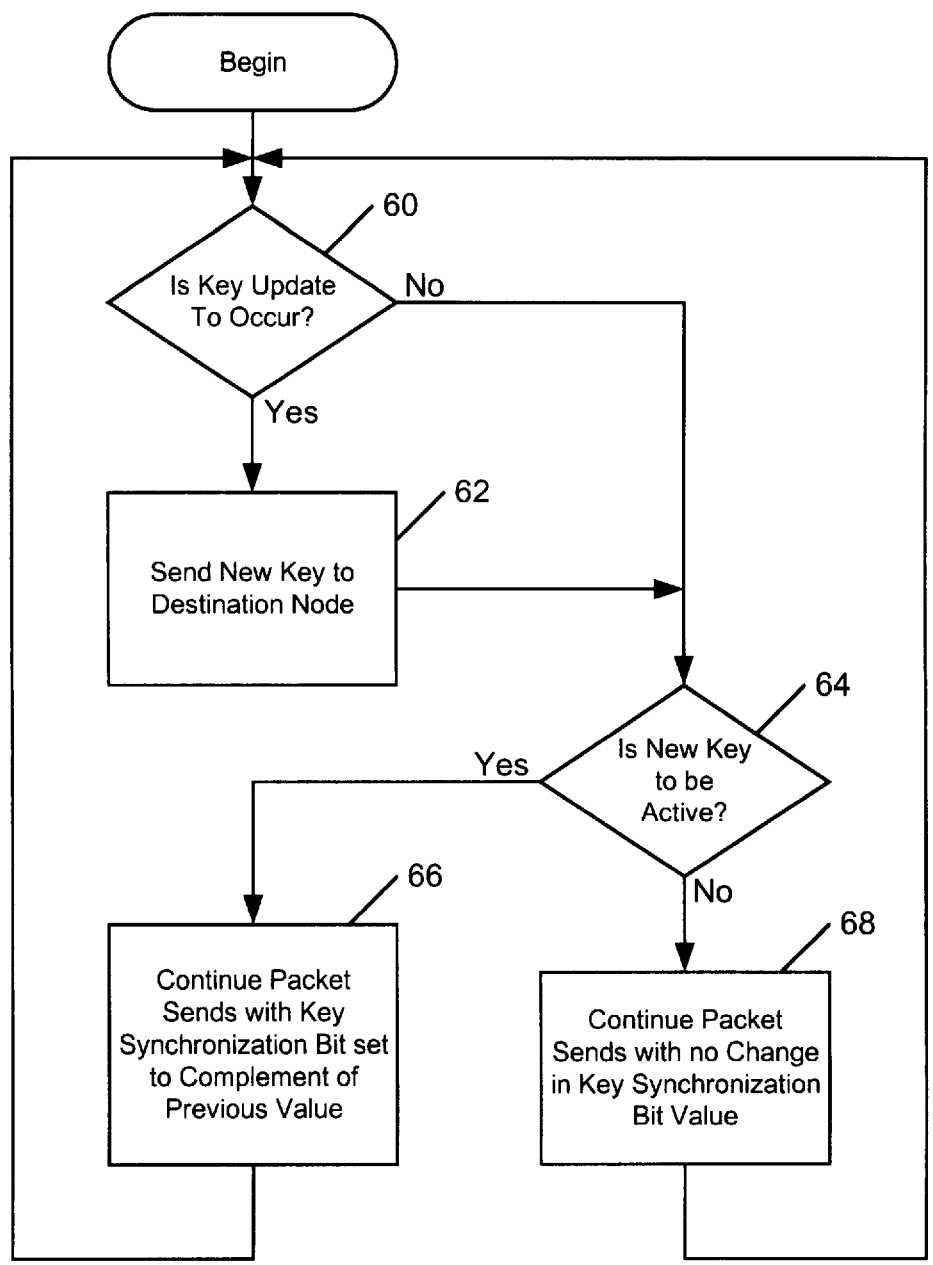
FIG. 6 is a flow chart of operations that are performed at a source node when use of a new encryption key is to be initiated.

FIG. 6 is a flow chart of steps that are performed at a source node in maintaining key synchronization in accordance with a preferred embodiment of the invention. It is assumed that the source node is already sending data packets as part of a process which is asynchronous to the key synchronization process being described. The point of entry into the key synchronization process is a test 60 whether the current encryption/decryption keys are to updated (changed). If the keys are to be updated, the new decryption key is sent to the destination node in an operation 62, using a conventional secure and reliable key exchange protocol. The specific key exchange protocol employed is not critical to the present invention. It only matters that the new key is sent to the destination node at which it is eventually to be used.

Even after the key is sent, data packets will continue to be encrypted using the old key until a decision is made to activate the new key. In theory, a test 64 could be is applied to a key just sent to the destination node or to a key sent at some earlier point in time. In either case, if test 64 shows the new key is to remain idle, data packets will continue to be encrypted and transmitted (operation 68) with the current KSB value. As a specific example, if the KSB value had been set to a "1" when the current encryption key was first used, it will remain at "1" for each data packet encrypted using the current key.

However, when the new key is activated, the KSB value will be set to "0" in any data packet encrypted and sent (operation 66) using the new key. Each time a new key is activated, the KSB value will be toggled to the complement of its former binary value.

FIG. 7 is a flow chart of operations that are performed at a destination node. Such a node receives and stores (operation 70) a new decryption key. The destination node continues to receive data packets (operation 72). When each packet is received, the binary value stored in the KSB position in its header is read (operation 74) and tested (operation 76) against the KSB value found in the preceding data packet. If the KSB value has not changed, the destination node continues to use the current decryption key (operation 78) to decrypt the packet. If, however, the KSB value has changed, the new key is retrieved from storage and activated to decrypt the packet payload in an operation 80.

While preferred embodiments of the invention are described, variations and modifications will occur to those skilled in the art once they become aware of the basic inventive concepts. For example, while the preferred embodiment calls for new keys to be distributed from a source node one at a time, it is within the scope of the present invention to distribute several keys to a destination node during a single key update operation. The destination node could store the keys in a list and could activate the next key on the list each time the KSB value in received data packets changes from packet to packet. Additionally, while a single KSB bit position is employed in a preferred embodiment, multiple bit positions could be assigned to the cell header. Finally, while the invention has been described for use in an ATM environment with its fixed length cells, it could also be effectively employed in systems in which variable length packets were used.

It is intended that the appended claims shall be construed as covering the preferred embodiment and all variations and modifications, including those described above, that fall within the true spirit and scope of the invention.

What is claimed is:

1. For use in a system including one or more source nodes for encrypting information using an encryption key, an interposed data communication network through which data packets including the encrypted information are transmitted, each of said data packets including a header and a data payload portion, and one or more destination nodes for decrypting received data packets using a decryption key, a method of maintaining synchronization between the encryption key used at a source node in encrypting a data packet and the decryption key used at a destination node to decrypt the same data packet, said method comprising the steps of:

sending a decryption key from the source node to the destination node;

storing said decryption key at the destination node;

at the source node, writing a predetermined binary value into one or more predetermiined bit positions in the header portion of each data packet to be decrypted using said decryption key;

at the destination node, monitoring said one or more bit positions in the header portion of each received data packet for the presence of said predetermined binary value; and at the destination node, activating said decryption key when said predetermined binary value is detected in said one or more predetermined bit positions.

2. A method as set forth in claim 1 wherein the predetermined binary value comprises the binary complement of the binary value stored in the corresponding predetermined bit positions of the header portion of the prior data packet.

3. For use at a source node in a system including one or more such source nodes for encrypting information using an encryption key, an interposed data communication network through which data packets including the encrypted information are transmitted, each of said data packets including a header and a data payload portion, and one or more destination nodes for decrypting received data packets using a decryption key, a method of maintaining synchronization between an encryption key used at the source node in encrypting data packets and a decryption key used at a destination node to decrypt the same packets after transmission through the network, said method comprising the steps of:

when an encryption key is to be activated, sending the corresponding decryption key from the source node to the destination node; and writing a predetermined binary value into one or more predetermined bit positions in the header portion of each data packet to be decrypted using said decryption key.

4. A method as set forth in claim 3 wherein the predetermined binary value comprises the binary complement of the binary value stored in the corresponding bit positions of the header portion of the prior data packet.

5. For use in a system including one or more source nodes for encrypting information using an encryption key, an interposed data communication network through which data packets including the encrypted information are transmitted, each of said data packets including a header and a data payload portion, and one or more destination nodes for decrypting received data packets using a decryption key, a key-synchronizing system for maintaining synchronization between the encryption key used at a source node to encrypt a data packet and the decryption key used at the destination node in decrypting the same data packet after transmission through the network, said key-synchronizing system comprising:

at the source node from which the encrypted packet is to be sent, means for sending a decryption key to the destination node which is to receive the packet;

at the destination node, means for storing said decryption key; at the source node, means for writing a predetermined binary value into one or more predetermined bit positions in the header portion of a data packet to be decrypted using said decryption key;

at the destination node, means monitoring the header portion of each received data packet for the presence of the predetermined binary value in the predetermined bit positions; and at the destination node, means for activating said decryption key when the predetermined binary value is detected.

6. A system as set forth in claim 5 wherein the predetermined binary value comprises the binary complement of the binary value written into corresponding bit positions of the prior data packet.

7. A key-synchronizing source node for use in a system including one or more source nodes for encrypting information using an encryption key, an interposed data communication network through which data packets including the encrypted information are transmitted, each of said data packets including a header and a data payload portion, and one or more destination nodes for decrypting received data packets using a decryption key, said key-synchronizing source node comprising:

means for sending a decryption key to at least one destination node to which data packets are to be sent; and means for writing a predetermined binary value into one or more predetermined bit positions in the header portion of each data packet which is to be decrypted using said decryption key at the destination node.

8. A key-synchronizing destination node for use in a system including one or more source nodes for encrypting information using an encryption key, an interposed data communication network through which data packets including the encrypted information are transmitted, each of said data packets including a header and a data payload portion, and one or more destination nodes for decrypting received data packets using a decryption key, said key-synchronizing destination node comprising:

means for receiving a decryption key from a source node from which data packets are being transmitted;

means for storing said decryption key; means for monitoring one or more predetermined bit positions in the header portion of each received data packet;

means for activating said decryption key when a predetermined change is detected in the predetermined bit positions of a received data packet.

9. For use in a system including one or more source nodes for encrypting information using an encryption key, an interposed data communication network through which data packets including the encrypted information are transmitted, each of said data packets including a header and a data payload portion, and one or more destination nodes for decrypting received data packets using a decryption key, a method of maintaining synchronization between the encryption key used at a source node in encrypting a data packet and the decryption key used at a destination node to decrypt the same data packet, said method comprising the steps of:

storing at least one unactivated decryption key at the destination node;

at the source node, writing a predetermined binary value into one or more predetermined bit positions in the header portion of each data packet to be decrypted using said decryption key;

at the destination node, monitoring said one or more bit positions in the header portion of each received data packet for the presence of said predetermined binary value; and at the destination node, activating said decryption key when the predetermined binary value is detected in said one or more predetermined bit positions of a received data packet.

10. A method as set forth in claim 9 wherein the predetermined binary value comprises the binary complement of the binary value stored in the corresponding bit positions of the header portion of the prior data packet.

11. For use at a source node in a system including one or more such source nodes for encrypting information using an encryption key, an interposed data communication network through which data packets including the encrypted information are transmitted, each of said data packets including a header and a data payload portion, and one or more destination nodes for decrypting received data packets using a decryption key, a method of maintaining synchronization between an encryption key used at the source node in encrypting data packets and a decryption key used at a destination node to decrypt the same packets after transmission through the network, said method comprising the steps of:

determining that a decryption key is to be activated at the destination node; and in response to such determination, writing a predetermined binary value into one or more predetermined bit positions in the header portion of each data packet to be decrypted using said decryption key.

12. A method as set forth in claim 11 wherein the predetermined binary value comprises the binary complement of the binary value stored in the corresponding bit positions of the header portion of the prior data packet.

13. For use in a system including one or more source nodes for encrypting information using an encryption key, an interposed data communication network through which data packets including the encrypted information are transmitted, each of said data packets including a header and a data payload portion, and one or more destination nodes for decrypting received data packets using a decryption key, a key-synchronizing system for maintaining synchronization between the encryption key used at a source node to encrypt a data packet and the decryption key used at the destination node in decrypting the same data packet after transmission through the network, said key-synchronizing system comprising:

at the destination node, means for storing at least one decryption key;

at the source node, means for writing a predetermined binary value into one or more predetermined bit positions in the header portion of a data packet to be decrypted using said decryption key;

at the destination node, means monitoring the header portion of each received data packet for the presence of said predetermined binary value in the predetermined bit positions; and at the destination node, means for retrieving said decryption key from storage and activating said key for each received data packet in which the predetermined binary value is detected.

14. A system as set forth in claim 13 wherein the predetermined binary value comprises the binary complement of the binary value written into corresponding bit positions of the prior data packet.

15. A key-synchronizing source node for use in a system including one or more source nodes for encrypting information using an encryption key, an interposed data communication network through which data packets including the encrypted information are transmitted, each of said data packets including a header and a data payload portion, and one or more destination nodes for decrypting received data packets using a decryption key, said key-synchronizing source node comprising:

means for determining when a decryption key is to be used at a destination node; and means for writing a predetermined binary value into predetermined bit positions in the header portion of each data packet which is to be decrypted at the destination node using said decryption key.

16. A key-synchronizing destination node for use in a system including one or more source nodes for encrypting information using an encryption key, an interposed data communication network through which data packets including the encrypted information are transmitted, each of said data packets including a header and a data payload portion, and one or more destination nodes for decrypting received data packets using a decryption key, said key-synchronizing destination node comprising:

means for storing at least one decryption key;

means for monitoring predetermined bit positions in the header portion of each received data packet;

means for activating a stored decryption key when a change is detected in the predetermined bit positions of a received data packet.

* * * * *